(12) United States Patent
Desai et al.

(10) Patent No.: US 12,008,534 B2
(45) Date of Patent: Jun. 11, 2024

(54) AUTHENTICATION OF TRANSACTIONS CONDUCTED USING MOBILE DEVICES

(71) Applicant: PROVE IDENTITY, INC., New York, NY (US)

(72) Inventors: Rodger R. Desai, New York, NY (US); Eric Woodward, Scottsdale, AZ (US)

(73) Assignee: Prove Identity, Inc., New York, NY (US)

( * ) Notice: Subject to any disclaimer, the term of this patent is extended or adjusted under 35 U.S.C. 154(b) by 237 days.

(21) Appl. No.: 17/565,435

(22) Filed: Dec. 29, 2021

(65) Prior Publication Data

US 2022/0198422 A1  Jun. 23, 2022

Related U.S. Application Data

(63) Continuation of application No. 16/393,461, filed on Apr. 24, 2019, now Pat. No. 11,232,423, which is a (Continued)

(51) Int. Cl.
*G06Q 20/20* (2012.01)
*G06Q 20/32* (2012.01)
(Continued)

(52) U.S. Cl.
CPC ....... *G06Q 20/202* (2013.01); *G06Q 20/3224* (2013.01); *G06Q 20/3227* (2013.01);
(Continued)

(58) Field of Classification Search
CPC ............. G06Q 20/202; G06Q 20/4015; G06Q 20/3224; G06Q 20/3227; G06Q 20/401;
(Continued)

(56) References Cited

U.S. PATENT DOCUMENTS 5,727,163 A  3/1998  Bezos
6,012,144 A  1/2000  Pickett
(Continued)

FOREIGN PATENT DOCUMENTS

CA  2774713  2/2011
CA  2844611  5/2012
(Continued)

OTHER PUBLICATIONS

Authors—"Method and Apparatus for Mobile Identity Authentication," http://ip.com/IPCOM/000194545, Mar. 29, 2010, 71 pages, Doc 1750.

(Continued)

*Primary Examiner* — Paul Danneman
(74) *Attorney, Agent, or Firm* — Husch Blackwell LLP; Bryan D. Stewart

(57) ABSTRACT

A transaction authentication system authenticates a transaction by determining whether a mobile device and POS device involved in the transaction are at the same location. A POS registry stores location data for POS devices. A PAN registry stores mobile device IDs corresponding to account numbers. A mobile device ID can be provided from the PAN registry in response to receiving an account number from a POS device. The mobile device ID can then be used to retrieve location information from a home location register maintained by a mobile service provider. The retrieved location data for a POS device and the retrieved location data for a mobile device are compared.

22 Claims, 4 Drawing Sheets

Related U.S. Application Data continuation of application No. 14/935,327, filed on Nov. 6, 2015, now Pat. No. 10,304,042.

(60) Provisional application No. 62/076,201, filed on Nov. 6, 2014.

(51) Int. Cl.
| | | |
|---|---|---|
| G06Q 20/40 | (2012.01) | |
| H04W 4/02 | (2018.01) | |
| H04W 4/029 | (2018.01) | |
| H04W 4/80 | (2018.01) | |
| H04W 12/06 | (2021.01) | |
| H04W 12/63 | (2021.01) | |

(52) U.S. Cl.
CPC ....... *G06Q 20/401* (2013.01); *G06Q 20/4015* (2020.05); *H04W 4/02* (2013.01); *H04W 4/029* (2018.02); *H04W 4/80* (2018.02); *H04W 12/06* (2013.01); *H04W 12/63* (2021.01)

(58) Field of Classification Search
CPC ......... H04W 4/029; H04W 4/80; H04W 4/02; H04W 12/06; H04W 12/63
See application file for complete search history.

(56) References Cited

U.S. PATENT DOCUMENTS

| | | | |
|---|---|---|---|
| 6,049,712 A | 4/2000 | Wallinder | |
| 6,963,638 B1 | 11/2005 | Keller | |
| 7,689,506 B2 | 3/2010 | Fei | |
| 7,720,887 B2 | 5/2010 | McCormack | |
| 8,380,574 B2 | 2/2013 | Naccache | |
| 8,606,640 B2 | 12/2013 | Brody | |
| 8,732,042 B2 * | 5/2014 | Hammad | G06Q 30/06 380/258 |
| 9,292,870 B2 | 3/2016 | Langley | |
| 9,679,285 B2 | 6/2017 | Brody | |
| 9,747,596 B2 | 8/2017 | Brody | |
| 9,767,449 B2 | 9/2017 | Brody | |
| 9,906,954 B2 | 2/2018 | Brody | |
| 10,304,042 B2 | 5/2019 | Desai | |
| 10,430,780 B2 | 10/2019 | Brody | |
| 10,963,858 B2 | 3/2021 | Brody | |
| 11,188,906 B2 * | 11/2021 | Ranganathan | G06Q 20/40 |
| 11,232,423 B2 | 1/2022 | Desai | |
| 2001/0037254 A1 | 11/2001 | Glikman | |
| 2002/0052754 A1 | 5/2002 | Joyce | |
| 2002/0077964 A1 | 6/2002 | Brody | |
| 2002/0143634 A1 | 10/2002 | Kumar | |
| 2003/0212601 A1 | 11/2003 | Silva | |
| 2004/0039651 A1 | 2/2004 | Grunzig | |
| 2004/0143545 A1 | 7/2004 | Kulakowski | |
| 2004/0243477 A1 | 12/2004 | Mathai | |
| 2005/0075945 A1 | 4/2005 | Hodge | |
| 2005/0114020 A1 | 5/2005 | Seto | |
| 2005/0144020 A1 | 6/2005 | Muzaffar | |
| 2006/0116105 A1 | 6/2006 | Frankel | |
| 2006/0117165 A1 | 6/2006 | Lilge | |
| 2006/0161646 A1 | 7/2006 | Chene | |
| 2006/0224470 A1 | 10/2006 | Ruano | |
| 2007/0027803 A1 | 2/2007 | Brandes | |
| 2007/0043664 A1 | 2/2007 | Wilkes | |
| 2007/0055623 A1 | 3/2007 | Jung | |
| 2007/0209051 A1 | 9/2007 | Xu | |
| 2007/0288377 A1 | 12/2007 | Shaked | |
| 2007/0299728 A1 | 12/2007 | Nemirofsky | |
| 2007/0299773 A1 | 12/2007 | Soderstrom | |
| 2008/0103984 A1 | 5/2008 | Choe | |
| 2008/0125117 A1 | 5/2008 | Jiang | |
| 2008/0126261 A1 | 5/2008 | Lovett | |
| 2008/0139171 A1 | 6/2008 | Bernath | |
| 2008/0140548 A1 | 6/2008 | Csoka | |
| 2008/0208743 A1 | 8/2008 | Arthur | |
| 2009/0006254 A1 | 1/2009 | Mumm | |
| 2009/0070691 A1 | 3/2009 | Jain | |
| 2010/0235276 A1 | 9/2010 | Smith | |
| 2010/0261477 A1 | 10/2010 | Duran | |
| 2010/0293065 A1 | 11/2010 | Brody | |
| 2011/0047045 A1 | 2/2011 | Brody | |
| 2011/0276478 A1 | 11/2011 | Hirson | |
| 2012/0023365 A1 | 1/2012 | Byom et al. | |
| 2012/0109826 A1 | 5/2012 | Kobres | |
| 2012/0150669 A1 | 6/2012 | Langley | |
| 2012/0203667 A1 | 8/2012 | Brody | |
| 2013/0155875 A1 | 6/2013 | Ayyasamy | |
| 2013/0238455 A1 | 9/2013 | Laracey | |
| 2014/0172710 A1 | 6/2014 | Brody | |
| 2014/0172711 A1 | 6/2014 | Brody | |
| 2014/0358785 A1 | 12/2014 | Brody | |
| 2016/0048830 A1 | 2/2016 | Laracey | |
| 2016/0132851 A1 | 5/2016 | Desai | |
| 2017/0323288 A1 | 11/2017 | Brody | |
| 2019/0050843 A1 | 2/2019 | Brody | |
| 2019/0251534 A1 | 8/2019 | Desai | |
| 2019/0370777 A1 | 12/2019 | Brody | |
| 2021/0201291 A1 | 7/2021 | Brody | |

FOREIGN PATENT DOCUMENTS

| | | |
|---|---|---|
| EP | 1197928 | 1/2004 |
| EP | 1646019 | 4/2006 |
| EP | 2146225 | 1/2010 |
| EP | 2465082 | 6/2012 |
| GB | 2371665 | 7/2002 |
| KR | 10-1006-0077541 | 7/2006 |
| KR | 10-2007-0121618 | 12/2007 |
| KR | 10-2008-0003760 | 1/2008 |
| KR | 10-2008-0009671 | 1/2008 |
| WO | WO2004061479 | 7/2004 |
| WO | WO2006106405 | 10/2006 |
| WO | WO2011019365 | 2/2011 |
| WO | WO2011062641 | 5/2011 |
| WO | WO2012060878 | 5/2012 |
| WO | WO2012138236 | 10/2012 |

OTHER PUBLICATIONS

Carr—"Mobile Payment Systems and Services, an Introduction", 2007, IDRBT, Hyberabad, 12 pages, Doc 1568.

Karnouskos—"Mobile Payment: A Journey Through Existing Procedures and Standardization Initiatives", IEEE Communications Surveys, the Electronic Magazine of Original Peer-Reviewed Survey Articles, Fourth Quarter 2004, vol. 6, No. 4, http://www.comsoc.org/pubs/surveys, 24 pages, Doc 1569.

Petrova—"Mobile Payment: Towards a Customer-Centric Model", Sep. 2008, Auckland University of Technology, Auckland, New Zealand, 12 pages, Doc 1570.

Rahimian—"MPaySmart: A Customer Centric Approach in Offering Efficient Mobile Payment Services", 2008 IEEE Asia-Pacific Services Computing Conference, Dec. 9-12, 2008, Department of Computer Engineering, Sharif University of Technology, Tehran, Iran, 6 pages, Doc 1571.

Schwartz—"Standards Watch: Simpay Reaching an Untapped Market", Dec. 1, 2004, B/OSS: Billing & OSS World, http://www.vpico.com/articlemanager/printerfirendly.aspx?article+158968, 3 pages, Doc 1572.

Soghoian—"Merx: Secure and Privacy Preserving Delegated Payments", Apr. 2009, Berkman Center for Internet and Society, Harvard University, USA, 23 pages, Doc 1573.

txtnation.com—"USSD Notifications: Get Real-Time Feedback From Your Customers, Without the Need for an Internet Connection", http://www.txtnation.com/mobile-messaging/ussd notifications/, accessed Aug. 15, 2017, 5 pages, Doc 1751.

U.S. Appl. No. 12/583,151 / Patent Application filed Aug. 14, 2009 100 pages, Doc 1563.

U.S. Appl. No. 12/583,151 / Filing Receipt and Notice to File Missing Parts dated Sep. 2, 2009, 5 pages, Doc 1564.

(56) References Cited

OTHER PUBLICATIONS

U.S. Appl. No. 12/583,151 / Updated Fiing Receipt dated Nov. 16, 2009, 3 pages, Doc 1565.
U.S. Appl. No. 12/583,151 / Corrected Fiing Receipt dated Dec. 22, 2009, 3 pages, Doc 1566.
U.S. Appl. No. 12/583,151 / Nonfinal Office Action dated Jul. 15, 2010, 15 pages, Doc 1574.
U.S. Appl. No. 12/583,151 / Preliminary Amendment filed Jul. 19, 2010, 27 pages, Doc 1575.
U.S. Appl. No. 12/583,151 / Amendment filed Nov. 15, 2010, 18 pages, Doc 1576.
U.S. Appl. No. 12/583,151 / Notice of Publication dated Nov. 18, 2010, 1 page, Doc 1577.
U.S. Appl. No. 12/583,151 / Final Office Action dated Jan. 28, 2011, 14 pages, Doc 1578.
U.S. Appl. No. 12/583,151 / Amendment filed Apr. 1, 2011, 22 pages, Doc 1579.
U.S. Appl. No. 12/583,151 / Advisory Action dated Apr. 15, 2011, 14 pages, Doc 1580.
U.S. Appl. No. 12/583,151 / Amendment filed May 3, 2011, 17 pages, Doc 1583.
U.S. Appl. No. 12/583,151 / Advisory Action dated May 31, 2011, 14 pages, Doc 1584.
U.S. Appl. No. 12/583,151 / Notice of Appeal filed Jun. 23, 2011, 5 pages, Doc 1585.
U.S. Appl. No. 12/583,151 / Request for Continued Examination and Amendment filed Aug. 1, 2011, 16 pages, Doc 1586.
U.S. Appl. No. 12/583,151 / Final Office Action dated May 29, 2014, 15 pages, Doc 1589.
U.S. Appl. No. 12/583,151 / Notice of Abandonment dated Dec. 5, 2014, 2 pages, Doc 1590.
CA Application CA2774713 / CA Application filed Mar. 20, 2012, 85 pages, Doc 1592.
CA Application CA2774713 / Request for Examination filed Jul. 14, 2015, pages, Doc 1593.
CA Application CA2774713 / Office Action dated Jul. 18, 2016, 4 pages, Doc 1594.
CA Application CA2774713 / Notice of Abandonment dated Mar. 1, 2017, 1 page, Doc 1595.
EP Application EP2010808435 / EP Application filed Mar. 14, 2012, 68 pages, Doc 1597.
EP Application EP2010808435 / Rule 161/162 Communication dated Apr. 16, 2012, 2 pages, Doc 1599.
EP Application EP2010808435 / Notice of Publication dated May 23, 2012, pages, Doc 1598.
EP Application EP2010808435 / Amendment filed Oct. 15, 2012, 11 pages, Doc 1604.
EP Application EP2010808435 / European Search Report dated Feb. 27, 2015, 7 pages, Doc 1600.
EP Application EP2010808435 / Withdrawal of Application filed Sep. 15, 2015, 2 pages, Doc 1605.
EP Application EP2010808435 / Confirmation of Withdrawal of Application dated Sep. 22, 2015, 1 page, Doc 1606.
PCT/US2010/002043 / PCT Application as filed Jul. 20, 2010, 80 pages, Doc 1607.
PCT/US2010/002043 / : International Search Report and Written Opinion dated Jan. 26, 2011, Korean Intellectual Property Office, 8 pages, Doc 1608.
PCT/US2010/002043 / International Preliminary Report on Patentability dated Feb. 14, 2012, 6 pages, Doc 1609.
U.S. Appl. No. 12/804,438 / Application as filed Jul. 20, 2010, 102 pages, Doc 1615.
U.S. Appl. No. 12/804,438 / Filing Receipt and Notice to File Missing Parts dated Aug. 30, 2010, 5 pages.
U.S. Appl. No. 12/804,438 / Updated Filing Receipt dated Nov. 12, 2010, 3 pages, Doc 1617.
U.S. Appl. No. 12/804,438 / Notice of Publication dated Feb. 24, 2011, 1 page, Doc 1618.
U.S. Appl. No. 12/804,438 / Nonfinal Office Action dated Sep. 22, 2011, 15 pages, Doc 1619.
U.S. Appl. No. 12/804,438 / Response to Nonfinal Office Action dated Mar. 27, 2012, 22 pages, Doc 1620.
U.S. Appl. No. 12/804,438 / Final Office Action mailed Jun. 11, 2012, 16 pages, Doc 1621.
U.S. Appl. No. 12/804,438 / Response to Final Office Action mailed Aug. 13, 2012, 24 pages, Doc 1622.
U.S. Appl. No. 12/804,438 / Advisory Action dated Aug. 29, 2012, 3 pages, Doc 1623.
U.S. Appl. No. 12/804,438 / Notice of Appeal filed Sep. 11, 2012, 6 pages, Doc 1624.
U.S. Appl. No. 12/804,438 / Appeal Brief and Amendment filed Nov. 19, 2012, 39 pages, Doc 1625.
U.S. Appl. No. 12/804,438 / Examiner's Answer to Appeal Brief dated Feb. 21, 2013, 11 pages, Doc 1626.
U.S. Appl. No. 12/804,438 / Request for Continued Examination and Amendment filed Sep. 10, 2013, 21 pages, Doc 1627.
U.S. Appl. No. 12/804,438 / Dismissal of Appeal dated Sep. 16, 2013, 2 pages, Doc 1628.
U.S. Appl. No. 12/804,438 / Notice of Allowance mailed Oct. 9, 2013, 7 pages, Doc 1629.
U.S. Appl. No. 12/804,438 / Issue Fee Payment and Rule 312 Amendment filed Oct. 29, 2013, 13 pages, Doc 1630.
U.S. Appl. No. 12/804,438 / Response to Rule 312 Amendment dated Nov. 8, 2013, 8 pages, Doc 1631.
U.S. Appl. No. 12/804,438 / Issue Notification dated Nov. 20, 2013, 1 page, Doc 1632.
U.S. Appl. No. 14/098,393 / Patent Application filed Dec. 5, 2013, 102 pages, Doc 1633.
U.S. Appl. No. 14/098,393 / Preliminary Amendment filed Dec. 10, 2013, 13 pages, Doc 1634.
U.S. Appl. No. 14/098,393 / Filing Receipt and Notice to File Missing Parts dated Dec. 24, 2013, 5 pages, Doc 1635.
U.S. Appl. No. 14/098,393 / Updated Filing Receipt dated Mar. 7, 2014, 3 pages, Doc 1636.
U.S. Appl. No. 14/098,393 / Notice of Publication dated Jun. 19, 2014, 1 page, Doc 1637.
U.S. Appl. No. 14/098,393 / Non-final Office Action dated Aug. 23, 2016, 14 pages, Doc 1638.
U.S. Appl. No. 14/098,393 / Amendment filed Nov. 23, 2016, 49 pages, Doc 1639.
U.S. Appl. No. 14/098,393 / Final Office Action dated Jan. 6, 2017, 16 pages, Doc 1640.
U.S. Appl. No. 14/098,393 / RCE and Amendment filed Jun. 6, 2017, 42 pages, Doc 1641.
U.S. Appl. No. 14/098,393 / Notice of Allowance / Allowability dated Jun. 28, 2017, 8 pages, Doc 1642.
U.S. Appl. No. 14/098,393 / 312 Amendment, Terminal Disclaimer, and Issue Fee Payment filed Jul. 21, 2017, 21 pages, Doc 1643.
U.S. Appl. No. 14/098,393 / Examiner Response to 312 Amendment dated Jul. 27, 2017, 11 pages, Doc 1644.
U.S. Appl. No. 14/098,393 / Corrected Filing Receipt dated Jul. 31, 2017, 4 pages, Doc 1645.
U.S. Appl. No. 14/098,393 / Examiner Response to 312 Amendment dated Jul. 31, 2017, 3 pages, Doc 1646.
U.S. Appl. No. 14/098,393 / Issue Notification dated Aug. 9, 2017, 1 pages, Doc 1647.
U.S. Appl. No. 14/098,401 / Patent Application filed Dec. 5, 2013, 108 pages., Doc 1648.
U.S. Appl. No. 14/098,401 / Preliminary Amendment filed Dec. 10, 2013, 12 pages, Doc 1649.
U.S. Appl. No. 14/098,401 / Notice to File Missing Parts dated Dec. 26, 2013, 5 pages, Doc 1650.
U.S. Appl. No. 14/098,401 / Filing Receipt dated Mar. 7, 2014, 3 pages, Doc 1651.
U.S. Appl. No. 14/098,401 / Notice of Publication dated Jun. 19, 2014, 1 page, Doc 1652.
U.S. Appl. No. 14/098,401 / Non-Final Rejection, Aug. 24, 2016, 14 pages, Doc 1653.
U.S. Appl. No. 14/098,401 / Amendment filed Nov. 23, 2016, 48 pages, Doc 1656.
U.S. Appl. No. 14/098,401 / Final Rejection, Jan. 5, 2017, 13 pages, Doc 1654.

(56) References Cited

OTHER PUBLICATIONS

U.S. Appl. No. 14/098,401 / RCE and Amendment filed Apr. 5, 2017, 21 pages, Doc 1655.
U.S. Appl. No. 14/098,401 / Applicant Initiated Interview Summary and Office Action Appendix dated Apr. 7, 2017, 4 pages, Doc 1657.
U.S. Appl. No. 14/098,401 / Notice of Allowance and Fees Due dated Apr. 28, 2017, 8 pages, Doc 1658.
U.S. Appl. No. 14/098,401 / Terminal Disclaimer and Issue Fee Payment filed May 11, 2017, 6 pages, Doc 1659.
U.S. Appl. No. 14/098,401 / Issue Notification dated May 24, 2017, 1 page, Doc 1660.
U.S. Appl. No. 14/267,878 / Patent Application filed May 1, 2014, 118 pages, Doc 1661.
U.S. Appl. No. 14/267,878 / Filing Receipt and Notice to File Missing Parts dated May 19, 2014, 6 pages, Doc 1662.
U.S. Appl. No. 14/267,878 / Updated Filing Receipt dated Aug. 26, 2014, 4 pages, Doc 1663.
U.S. Appl. No. 14/267,878 / Notice of Publication dated Dec. 4, 2014, 1 page, Doc 1664.
U.S. Appl. No. 14/267,878 / Restriction Requirement dated Dec. 21, 2016, 6 pages, Doc 1665.
U.S. Appl. No. 14/267,878 / Amendment and Response to Restriction Requirement filed Feb. 21, 2017, 8 pages, Doc 1666.
U.S. Appl. No. 14/267,878 / Non-final Office Action dated Mar. 8, 2017, 17 pages, Doc 1667.
U.S. Appl. No. 14/267,878 / Amendment filed Jun. 8, 2017, 32 pages, Doc 1668.
U.S. Appl. No. 14/267,878 / Notice of Allowance / Allowability dated Jul. 6, 2017, 8 pages, Doc 1669.
U.S. Appl. No. 14/267,878 / 312 Amendment and Issue Fee Payment dated Jul. 21, 2017, 10 pages, Doc 1670.
U.S. Appl. No. 14/267,878 / Examiner Response to 312 Amendment dated Aug. 17, 2017, 3 pages, Doc 1671.
U.S. Appl. No. 14/267,878 / Corrected Filing Receipt dated Aug. 23, 2017, 4 pages, Doc 1672.
U.S. Appl. No. 14/267,878 / Issue Notification dated Aug. 30, 2017, 1 page, Doc 1673.
U.S. Appl. No. 15/657,093 / Patent Application filed Jul. 21, 2017, 120 pages, Doc 1674.
U.S. Appl. No. 15/657,093 / Filing Receipt dated Aug. 3, 2017, 4 pages, Doc 1675.
U.S. Appl. No. 15/657,093 / Notice of Publication dated Nov. 9, 2017, 1 page, Doc 1676.
U.S. Appl. No. 15/657,093 / Non-final Office Action dated Dec. 28, 2018, 10 pages, Doc 1677.
U.S. Appl. No. 15/657,093 / Amendment filed May 16, 2019, 20 pages, Doc 1678.
U.S. Appl. No. 15/657,093 / Notice of Allowance / Allowability dated Jun. 12, 2019, 8 pages, Doc 1679.
U.S. Appl. No. 15/657,093 / 312 Amendment and Issue Fee Payment dated Aug. 16, 2019, 4 pages, Doc 1680.
U.S. Appl. No. 15/657,093 / Issue Notification dated Sep. 11, 2019, 1 page, Doc 1681.
U.S. Appl. No. 16/543,358 / Patent Application filed Aug. 16, 2019, 124 pages, Doc 1682.
U.S. Appl. No. 16/543,358 / Filing Receipt dated Aug. 28, 2019, 4 pages, Doc 1683.
U.S. Appl. No. 16/543,358 / Notice of Publication dated Dec. 5, 2019, 1 page, Doc 1684.
U.S. Appl. No. 16/543,358 / Non-final Office Action dated Aug. 30, 2021, 18 pages, Doc 1685.
U.S. Appl. No. 16/543,358 / Amendment filed Nov. 23, 2021, 21 pages, Doc 1686.
U.S. Appl. No. 16/543,358 / Terminal Disclaimer filed Jan. 27, 2022, 5 pages, Doc 1687.
U.S. Appl. No. 16/543,358 / Notice of Allowance / Allowability dated Feb. 15, 2022, 9 pages, Doc 1688.
U.S. Appl. No. 16/543,358 / Notice of Allowance / Allowability dated Mar. 4, 2022, 5 pages, Doc 1689.
U.S. Appl. No. 16/543,358 / Corrected Filing Receipt dated May 5, 2022, 4 pages, Doc 1690.
U.S. Appl. No. 16/543,358 / 312 Amendment and Issue Fee Payment filed May 16, 2022, 16 pages, Doc 1691.
U.S. Appl. No. 16/543,358 / Examiner Response to 312 Amendment dated May 27, 2022, 2 pages, Doc 1692.
U.S. Appl. No. 16/143,205 / Patent Application filed Sep. 26, 2018, 121 pages, Doc 1693.
U.S. Appl. No. 16/143,205 / Filing Receipt dated Nov. 7, 2018, 4 pages, Doc 1694.
U.S. Appl. No. 16/143,205 / Notice of Publication dated Feb. 14, 2019, 1 page, Doc 1695.
U.S. Appl. No. 16/143,205 / Non-final Office Action dated Apr. 2, 2020, 9 pages, Doc 1696.
U.S. Appl. No. 16/143,205 / Amendment filed Jul. 2, 2020, 14 pages, Doc 1697.
U.S. Appl. No. 16/143,205 / Notice of Allowance / Allowability dated Oct. 7, 2020, 7 pages, Doc 1698.
U.S. Appl. No. 16/143,205 / 312 Amendments and Issue Fee Payment filed Jan. 5, 2021, 15 pages, Doc 1699.
U.S. Appl. No. 16/143,205 / Corrected Filing Receipt dated Jan. 13, 2021, 4 pages, Doc 1700.
U.S. Appl. No. 16/143,205 / Issue Notification, 1 page, Doc 1701.
U.S. Appl. No. 17/141,896 / Patent Application filed Jan. 5, 2021, 112 pages, Doc 1702.
U.S. Appl. No. 17/141,896 / Filing Receipt and Notice to File Missing Parts dated Jan. 21, 2021, 6 pages, Doc 1703.
U.S. Appl. No. 17/141,896 / Preliminary Amendment filed Mar. 24, 2021, 9 pages, Doc 1704.
U.S. Appl. No. 17/141,896 / Updated Filing Receipt dated Mar. 25, 2021, 4 pages, Doc 1705.
U.S. Appl. No. 17/141,896 / Restriction Requirement dated May 19, 2022, 7 pages, Doc 1706.
PCT/US2010/003027 / PCT Application as filed Jul. 20, 2010, 54 pages, Doc 1610.
PCT/US2010/003027 / International Search Report and Written Opinion dated Nov. 23, 2011, 7 pages, Doc 1611.
PCT/US2010/003027 / International Preliminary Report on Patentability dated May 30, 2012, 6 pages, Doc 1612.
U.S. Appl. No. 13/373,069 / Patent Application filed Nov. 3, 2011, 62 pages, Doc 1707.
U.S. Appl. No. 13/373,069 / Filing Receipt and Notice to File Missing Parts dated Nov. 21, 2011, 5 pages, Doc 1708.
U.S. Appl. No. 13/373,069 / Updated Filing Receipt dated Apr. 30, 2012, 3 pages, Doc 1709.
U.S. Appl. No. 13/373,069 / Notice of Publication dated Aug. 9, 2012, 1 page, Doc 1710.
U.S. Appl. No. 13/373,069 / Non-final Office Action dated Feb. 1, 2014, 11 pages, Doc 1711.
U.S. Appl. No. 13/373,069 / Notice of Abandonment dated Jun. 22, 2015, 2 pages, Doc 1712.
PCT/US11/01853 / PCT Application filed Nov. 3, 2011, 30 pages, Doc 1713.
PCT/US11/01853 / Intl Search Report and Written Opinion dated May 2, 2013, 10 pages, Doc 1714.
PCT/US11/01853 / International Preliminary Report on Patentability dated May 8, 2013, 7 pages, Doc 1715.
CA Application CA2844611 / CA Patent Application filed Feb. 7, 2014, 37 pages, Doc 1718.
CA Application CA2844611 / Notice of Abandonment dated Dec. 15, 2015, 1 page, Doc 1719.
U.S. Appl. No. 14/935,327 / Patent Application filed Nov. 6, 2015, 31 pages, Doc 1720.
U.S. Appl. No. 14/935,327 / Filing Receipt dated Nov. 24, 2015, 3 pages, Doc 1721.
U.S. Appl. No. 14/935,327 / Notice of Publication dated May 12, 2016, 1 page, Doc 1722.
U.S. Appl. No. 14/935,327 / Corrected Filing Receipt dated Oct. 11, 2016, 3 pages, Doc 1723.
U.S. Appl. No. 14/935,327 / Non-final Office Action dated Jan. 12, 2018, 13 pages, Doc 1724.
U.S. Appl. No. 14/935,327 / Amendment filed Apr. 12, 2018, 22 pages, Doc 1725.

(56) References Cited

OTHER PUBLICATIONS

U.S. Appl. No. 14/935,327 / Final Office Action dated Jul. 19, 2018, 22 pages, Doc 1726.
U.S. Appl. No. 14/935,327 / Notice of Appeal filed Aug. 30, 2018, 3 pages, Doc 1727.
U.S. Appl. No. 14/935,327 / Appeal Brief filed Oct. 9, 2018, 30 pages, Doc 1728.
U.S. Appl. No. 14/935,327 / Notice of Allowance / Allowability dated Jan. 22, 2019, 7 pages, Doc 1729.
U.S. Appl. No. 14/935,327 / Issue Fee Payment filed Apr. 18, 2019, 3 pages, Doc 1730.
U.S. Appl. No. 14/935,327 / Issue Notification dated May 8, 2019, 1 page, Doc 1731.
U.S. Appl. No. 16/393,461 / Patent Application filed Apr. 24, 2019, 33 pages, Doc 1732.
U.S. Appl. No. 16/393,461 / Filing Receipt dated May 8, 2019, 4 pages, Doc 1733.
U.S. Appl. No. 16/393,461 / Notice of Publication dated Aug. 15, 2019, 1 page, Doc 1734.
U.S. Appl. No. 16/393,461 / Corrected Filing Receipt dated Jul. 13, 2020, 3 pages, Doc 1735.
U.S. Appl. No. 16/393,461 / Non-final Office Action dated Oct. 19, 2020, 6 pages, Doc 1736.
U.S. Appl. No. 16/393,461 / Amendment and Terminal Disclaimer filed Jan. 19, 2021, 16 pages, Doc 1737.
U.S. Appl. No. 16/393,461 / Notice of Allowance / Allowability dated Apr. 23, 2021, 7 pages, Doc 1738.
U.S. Appl. No. 16/393,461 / Request for Continued Examination and Amendment filed Jul. 16, 2021, 12 pages, Doc 1739.
U.S. Appl. No. 16/393,461 / Notice of Allowance / Allowability dated Sep. 15, 2021, 7 pages, Doc 1740.
U.S. Appl. No. 16/393,461 / Issue Fee Payment filed Dec. 14, 2021, 8 pages, Doc 1741.
U.S. Appl. No. 16/393,461 / Issue Notification dated Jan. 5, 2022, 1 page, Doc 1742.
U.S. Appl. No. 17/141,896 / Issue Fee payment and Response filed Nov. 3, 2022, 9 pages, Doc 1857.
U.S. Appl. No. 17/141,896 / Issue Notification dated Nov. 30, 2022, 1 page, Doc 1858.
U.S. Appl. No. 17/141,896 / Response to Restriction/Election Requirement dated Jul. 19, 2022, 9 pages, Doc 1833.
U.S. Appl. No. 17/141,896 / Notice of Allowance / Allowability dated Aug. 10, 2022, 26 pages, Doc 1834.

* cited by examiner

AUTHENTICATION OF TRANSACTIONS CONDUCTED USING MOBILE DEVICES

CROSS REFERENCES TO RELATED APPLICATIONS

This application is a continuation of U.S. Nonprovisional application Ser. No. 14/935,327 entitled "Location-Based Authentication Of Transactions Conducted Using Mobile Devices," filed Nov. 6, 2015, which claims the benefit of U.S. Provisional Application No. 62/076,201 entitled "Location-Based Authentication Of Transactions Conducted Using Mobile Devices," filed Nov. 6, 2014, which is expressly incorporated by reference in its entirety for all purposes as if fully set forth herein.

BACKGROUND OF THE INVENTION

Conducting transactions using mobile devices is becoming increasingly popular. Mobile devices can communicate with a point-of-sale (POS) device or terminal, such as by NFC or other short range signaling, in order to communicate account and other transaction information. A user of the mobile device can thus use one or more accounts (credit, debit or other) without having to carry and present a traditional payment card to a merchant.

Transactions conducted with mobile devices do carry some risk. For example, a fraudster may be able to obtain payment credential information (account number and related data needed for a transaction) and use that information to attempt a transaction with a device that is not the mobile device of the authorized account holder. Banks and other financial institutions processing card transactions may require higher levels of scrutiny to authenticate the user when the transaction is conducted using a mobile device, sometimes leading to transactions being declined (out of an abundance of caution) when there is any uncertainty about the transaction.

Thus, additional forms of authenticating the user can be useful for these types of transactions.

BRIEF SUMMARY OF THE INVENTION

There is provided, in accordance with embodiments of the present invention, a network/system and method for authenticating a transaction by obtaining locations for a mobile device and for a POS device that are being used for the transaction, and comparing the locations to determine whether or not they are the same.

In one embodiment, a method for authenticating a transaction conducted at a point of sale (POS) device with a mobile device comprises: at a POS registry, storing, in association with a POS ID corresponding to each of one or more POS devices, POS location data pertaining to the location of the corresponding POS device; at a PAN registry, storing, in association with an account ID corresponding to each of one or more accounts, a mobile device ID identifying a mobile device for conducting transactions using the corresponding account; receiving, at a transaction authentication system, transaction data for a transaction conducted against a specified account at a specified POS device by a customer, the transaction data comprising a POS identifier for the specified POS device and an account ID for the specified account; with the received transaction data at the transaction authentication system, (1) accessing the POS registry for location data for the specified POS device, and (2) accessing the PAN registry to retrieve a mobile device ID associated with the mobile device; using the retrieved mobile device ID to determine the location data for the specified mobile device, by accessing location information maintained by a mobile service provider; and comparing the accessed location data for the specified POS device and the determined location data for specified mobile device.

A more complete understanding of the present invention may be derived by referring to the detailed description of the invention and to the claims, when considered in connection with the Figures.

DETAILED DESCRIPTION OF THE INVENTION

There are various embodiments and configurations for implementing the present invention. Generally, embodiments provide systems and methods for authenticating a transaction that is conducted using a mobile device at a point-of-sale (POS) terminal, by determining whether the mobile device conducting the transaction is at a location near the POS terminal.

In one embodiment, a transaction authentication system includes a POS registry and a PAN registry. The POS registry maintains location information for a plurality of POS terminals. The PAN registry stores and maintains identifying data (e.g., a SIM card number) for a mobile device used as a payment device. When a transaction is conducted, the transaction authentication system accesses the POS registry to determine the location of the POS terminal used for the transaction, and accesses the PAN registry to look up the SIM card number (and device/phone) associated with the account number being used for the transaction. The looked-up phone number or SIM card number is then used to access location data maintained by a mobile service provider (e.g., an entity that provides mobile service to the mobile device used for the transaction), with the accessed location data relating to the location of the authorized mobile device. In one embodiment, the accessed location data is data at a home location register (HLR) maintained by the mobile service provider.

While embodiments of the invention described herein relate to transactions where a mobile device serves as the presentation instrument (payment card) of a consumer/user, it should be appreciated that the invention is not so limited. For example, transactions in which a consumer is using a traditional payment card (separate from the mobile device) can also be authenticated using location information relating to the POS device at which the transaction is being conducted and location information relating to a mobile device of the consumer. Since mobile devices are usually carried by consumers when away from their home or residence, it is likely that a consumer conducting a transaction with a traditional payment card is likely to have that consumer's mobile device in his/her possession. Accordingly, a consumer who has both a mobile device and a traditional payment card is likely to carry both at the same time, and knowing the location of the mobile device likely reflects the location of the authorized user. Thus, in accordance with embodiments of the invention, the authentication of physical card transactions can consider, among other things, the location of a cardholder's mobile device (in relation to the location of the POS device at which a transaction is being conducted).

Figure 1:
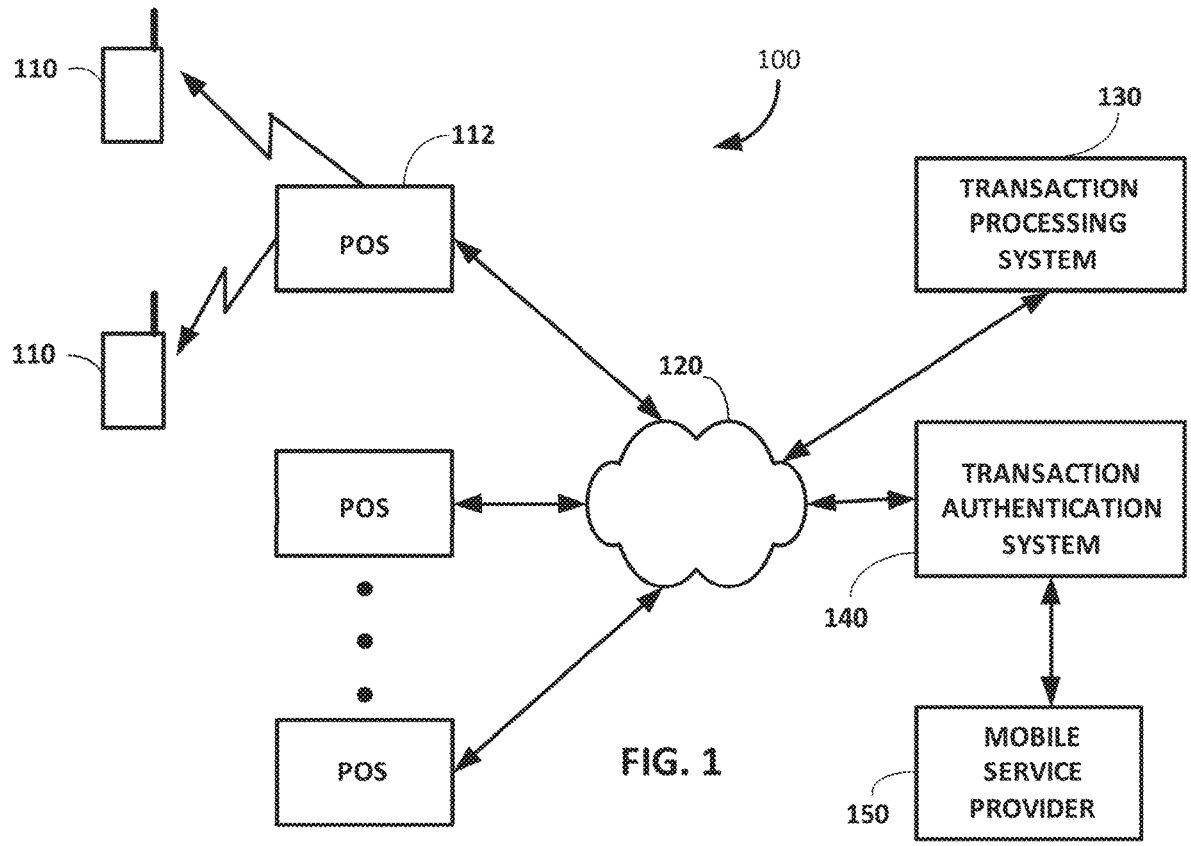
FIG. 1 is a general block diagram showing a network in which transactions are processed, where individual transactions may be conducted by a user with a mobile device.

Referring now to FIG. 1, a network 100 according to one embodiment of the invention is illustrated. The network 100 includes a plurality of mobile devices 110 that communicate with POS devices or terminals 112 for purposes of conducting transactions at the POS devices 112.

The mobile devices 110 each include a smart card chip that enables the payment functionality of the mobile devices. The mobile devices 110 further each include a SIM (subscriber identity module) card that is used by a mobile service provider to track and identify mobile devices. The SIM card stores various data, including data identifying the SIM card (e.g., ICCD), an international mobile subscriber identity (IMSI) number or mobile identification number (MIN) that uniquely identifies the mobile device in which the SIM card is installed, security authentication and ciphering information for communications from the mobile device, mobile subscriber network identification, a list of services that the user of the mobile device has access to, and other data and information known to those skilled in the art. SIM cards are replaceable to reflect any changes in the nature of services provided by the mobile device.

The POS devices 112 are connected to communicate through a payment processing communications network 120 to a transaction processing system 130. The transaction processing system 130 may be in turn connected to communicate with financial institutions (not shown) that maintain accounts against which transactions are conducted. The financial institutions may approve or decline a transaction based on account limits, account balances and other information pertaining to the risk associated with the transaction. In some cases, transactions may be approved or declined by the transaction processing system acting on behalf of the financial institutions.

In accordance with one embodiment of the invention, the transaction processing system 130 may also communicate through network 120 to a transaction authentication system 140, which in turn may be connected for communication with a mobile service provider 150. As will be described shortly, the transaction authentication system 140 may be used by the transaction processing system 130 to authenticate transactions between mobile devices 110 and POS devices 112, using location data associated with the mobile devices and POS devices. The transaction authentication system 140 accesses the mobile service provider 150 in order to determine the location of a mobile device 110 being used to conduct a transaction.

Figure 2:
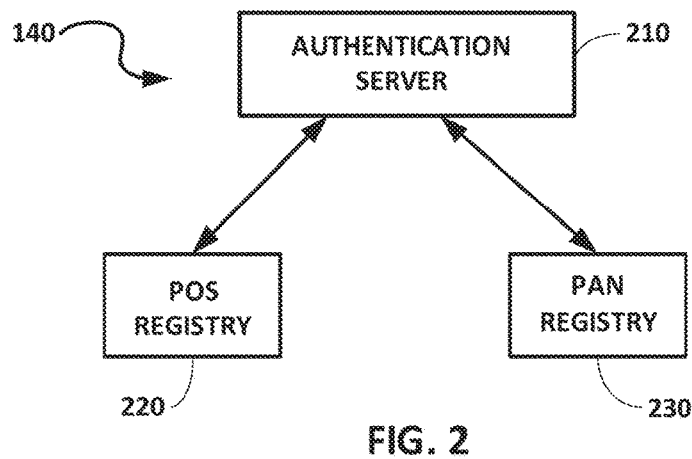
FIG. 2 illustrates in greater detail the transaction authentication system seen in FIG. 1

FIG. 2 illustrates in greater detail the transaction authentication system 140. The system 140 includes an authentication server 210, a POS registry 220 and a PAN registry 230. The POS registry 220 maintains location data for the various POS devices 112 (the POS registry may be implemented at a memory device associated with server 210). The PAN registry 230 maintains account information and associated mobile device ID information (the PAN registry may likewise be implemented at a memory device associated with server 210). The PAN registry 230 thus permits identification of a mobile device in response to receipt of an account number provided with transaction information from a POS device 112. The mobile device ID information provided by the PAN registry 230 may be a telephone number, SIM card identifier (IMSI or MIN), or other mobile device identifying data.

Figure 3:
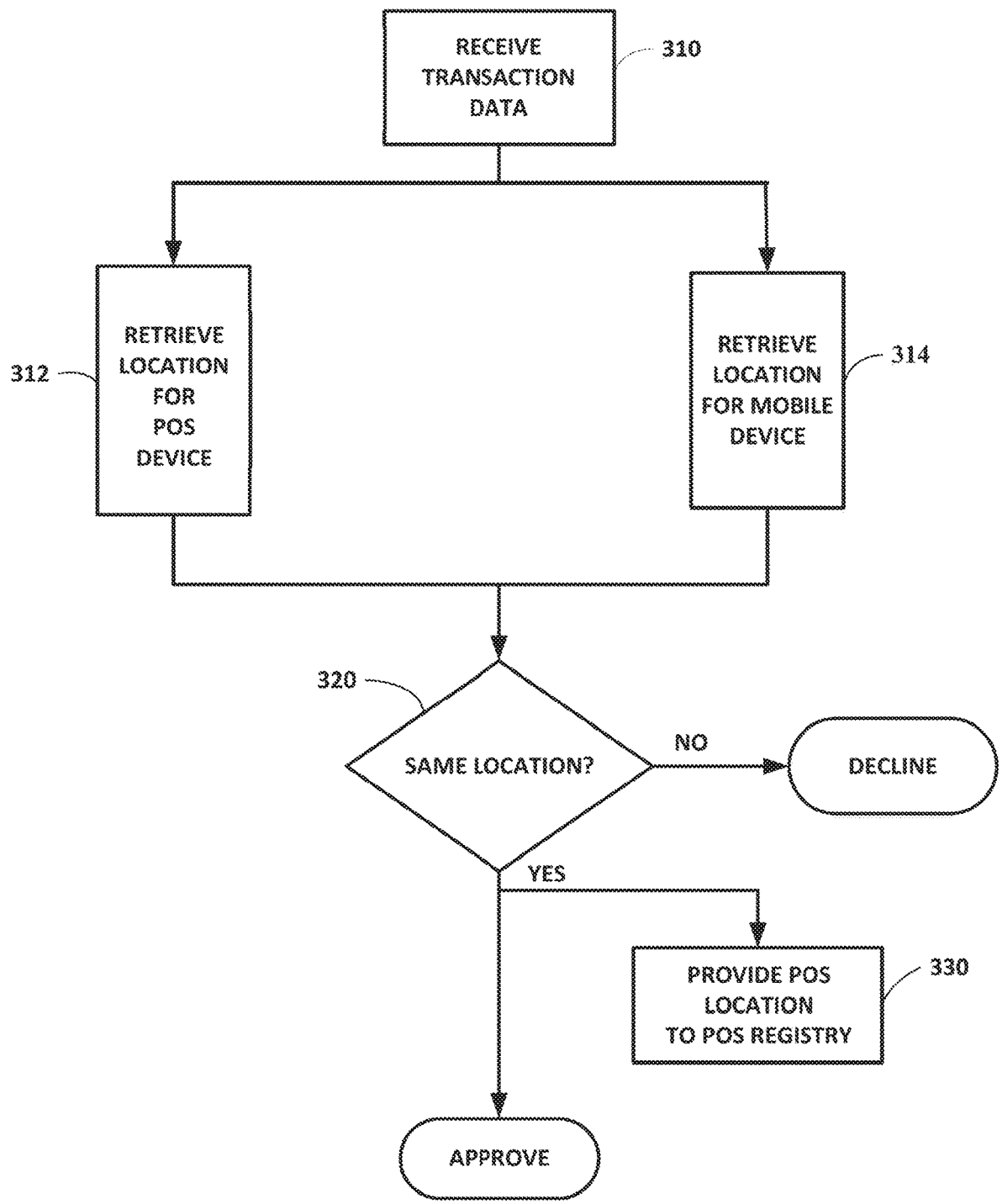
FIG. 3 is a flow diagram illustrating a process for authenticating transactions in accordance with one embodiment of the invention.

FIG. 3 illustrates a process that may be implemented at the transaction processing system 130 and the authentication server 210, for purposes of authenticating a transaction conducted between a mobile device 110 and a POS device 112. At step 310, transaction data is received for a transaction at a POS device 112. The transaction data may be data taken from an authorization request message received at the transaction processing system 310. Such a message typically includes various information concerning a transaction that has been initiated at a POS device 112, including information concerning the account being used (provided in wireless communications between the mobile device 110 and the POS device 112), an identifier for the POS device 112, and various other kinds of information associated with the transaction (transaction amount, card expiration date, a merchant identifier, transaction ID, etc.). On behalf of the financial institution maintaining the account, the transaction processing system 130 may use various information concerning the transaction in order to authenticate the transaction (e.g., to prevent fraud). At step 310, the transaction authentication system 140 receives (e.g., from data in a transaction authorization request) a POS ID for the POS device 112 conducting the transaction and account information (e.g., the account number or PAN) provided by the mobile device 110 to the POS device 112.

At step 312, the server 210 uses the transaction data received at step 310 in order to retrieve location information for the POS device stored in the POS registry 220 (such retrieval based on the POS ID received at step 310).

At step 314, the server 210 uses the transaction data received at step 310 in order to retrieve the mobile device ID stored in the PAN registry 230 (such retrieval based on the account number/ID received at step 310). Further at step 314, the retrieved mobile device ID is provided to the mobile service provider 150 for a real-time location of the mobile device 110 associated with the mobile device ID. In one embodiment, the mobile service provider 150 obtains the real-time location based on information in the home location register (HLR) maintained by the service provider. The HLR is a central database that contains details of each mobile device subscriber that is authorized to use the mobile network of the service provider, including (among other things) the current location of the mobile device, subscription data (services to which the user of the mobile device has subscribed, and cryptograms used in authenticating a mobile device when it initiates communications in a home network or any roaming network. In the described embodiment, the location data within the HLR is retrieved using the mobile device ID (IMSI/MIN) received at step 310. In some embodiments, the location data is retrieved from the HLR using a mobile service provider Signal Transfer Point (STP) or similar network element to rapidly provide the location data to the authentication server 210. Further details concerning the HLR and the location information for a mobile device that it maintains will be provided later.

While the process illustrated in FIG. 3 provides for retrieval of a mobile device ID directly from a provided account number, in some embodiments the authentication system may use an account number to first access account holder personal information (e.g., name, account holder ID, etc.), and then use the personal information to retrieve the mobile device ID stored in association with the account holder personal information.

In some embodiments, real-time location data for mobile devices based on a mobile ID (SIM card number) might be collected (periodically or continuously) from multiple mobile service providers (e.g., their HLRs) and stored at one location for immediate access by the authentication server (e.g., based on look up of mobile ID's at the PAN registry).

At step 320, the authentication server 210 determines whether the mobile device 110 and the POS device 112 are at the same location by comparing the location data retrieved at steps 312 and 314. If they are not, the transaction authentication system 140 determines that the transaction should be declined and communicates such result to the transaction processing system 130. If the server 210 determines that the mobile device 110 and the POS device 112 are in fact at the same location, then the transaction is approved and such result is communicated to the transaction processing system 130.

In some embodiments, the authentication server 210 may also calculate a score representing the likelihood that the POS device and mobile device are at the same location at step 320. For example, the authentication server 210 may evaluate the following factors in calculating such a score:

(1) patterns locations of past approved transactions, and whether a retrieved mobile device location is inconsistent with such patterns; (2) a mobile device location that is known to be used by fraudsters in attempting to conduct fraudulent transactions; (3) history of past fraudulent transactions involving the POS device location, especially when the POS device location reflects that the POS device has frequently moved; and (4) increasing numbers of reported fraudulent transactions involving mobile devices, especially in the location of the POS device or the location of the mobile device being used for the transaction. The preceding factors are only exemplary, and other factors are possible in calculating a score.

It should be noted that there may be several different ways for obtaining location information stored within the POS registry 220. In one embodiment, the location of each POS terminal may be provided in advance by the merchant or other entity operating the POS device. In another embodiment, the location of the POS terminal may be determined and updated in response to approved transactions where the POS device has been found to be at the same location as a mobile device 110. This last mentioned embodiment has particular usefulness when a POS device may change locations, such as would be the case with a POS device used by a merchant that has multiple locations or that travels for sales/transactions at different remote locations. This last mentioned embodiment is illustrated at step 330 of FIG. 3, where the POS location as reflected in a transaction approved at step 320 (and being the same location as a mobile device reflected, e.g., at an HLR maintained by the mobile service provider) is provided to the POS registry.

Figure 4:
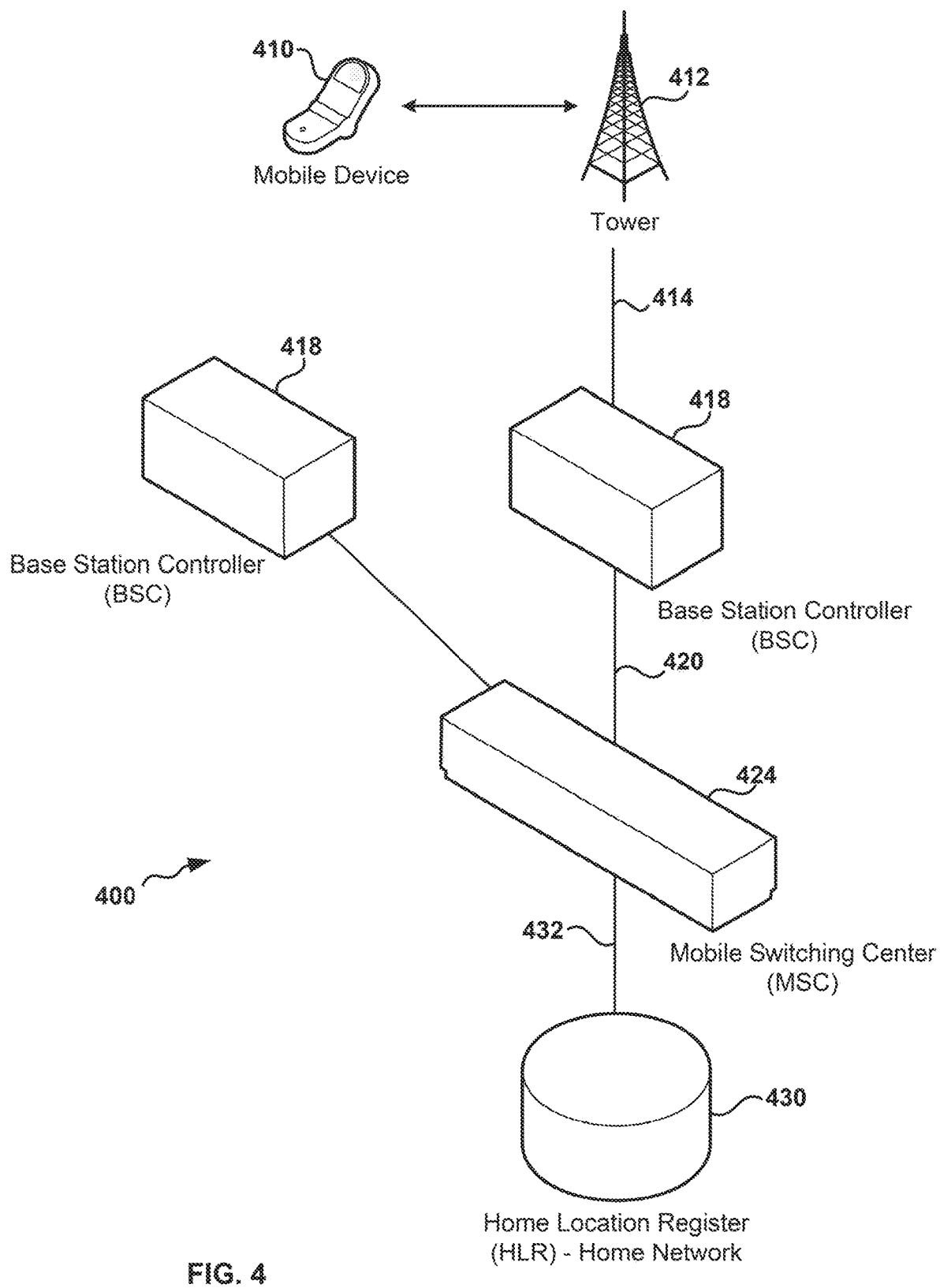
FIG. 4 illustrates a mobile data network in which mobile devices may be used to conduct transactions.

Turning now to FIG. 4, there is generally illustrated a mobile data network 400 having various components or systems that may be used to implement one embodiment of the invention. As seen, a mobile device 410 communicates via bi-directional radio signals with a network tower 412 having a base transceiver station or BTS (not shown) that handles radio communications between the network tower and the mobile device. In some cases, there may be more than one BTS physically located at the tower 412. In most conventional systems, the network tower or BTS is assigned to a cell or particular location area identified by a Location Area Identity (LAI), which thus uniquely identifies each location area in which mobile devices are operating. The network tower 412 (and its BTS) communicate by way of a transmission line 414 with a base station controller (BSC) 418 that handles allocation of radio channels, frequency administration, power and signal measurements from the mobile device, and also may institute handovers from one BTS to another for a device traveling in its coverage area. The BSC also funnels wireless communications via a transmission line 420 to a mobile switching center (MSC) 424, which manages communications with mobile devices in a coverage area for which the MSC and its various BCSs and BTSs are used. As illustrated in FIG. 4, there may be multiple BSCs 418 handling communications for a large number of mobile devices that are operating in the MSC coverage area.

The network 400 also illustrates a home location register (HLR) 430 containing information for all "home" subscribers of the mobile service provider. The HLR 430 is located at a central system (not shown) operated by the mobile service provider. Each service provider in the network 400 would have its own HLR 430. Although only one HLR 430 is illustrated in FIG. 4, it should be appreciated that there are multiple HLRs, each connected (at the central system of its respective mobile service provider) by way of a transmission line 432 to each the mobile switching centers 424 in the network. From the foregoing, it should be appreciated that the network 400 represents a plurality of mobile networks, each mobile network operated by a mobile service provider, each having an HLR 430, and each having multiple MSCs connecting to multiple BSCs and to network towers 412.

As mentioned earlier, each HLR maintains, among other things, the current location of every mobile device for subscribers in the home network with which the HLR is associated. It should be appreciated that, in the general illustration of FIG. 4, the mobile switching center (MSC) 424 could be a switching center within that home network or could be a mobile switching center associated with networks of other mobile service providers (where a subscriber may be roaming). The HLR maintains location information for the mobile device 410 of each of its subscribers, regardless of whether the MSC 424 serving the mobile device is in the home network or in a different provider's network. In most conventional mobile networks, location information stored in the HLR is an identifier for the MSC 424 managing the coverage area where the subscriber's mobile device is located.

Figure 5:
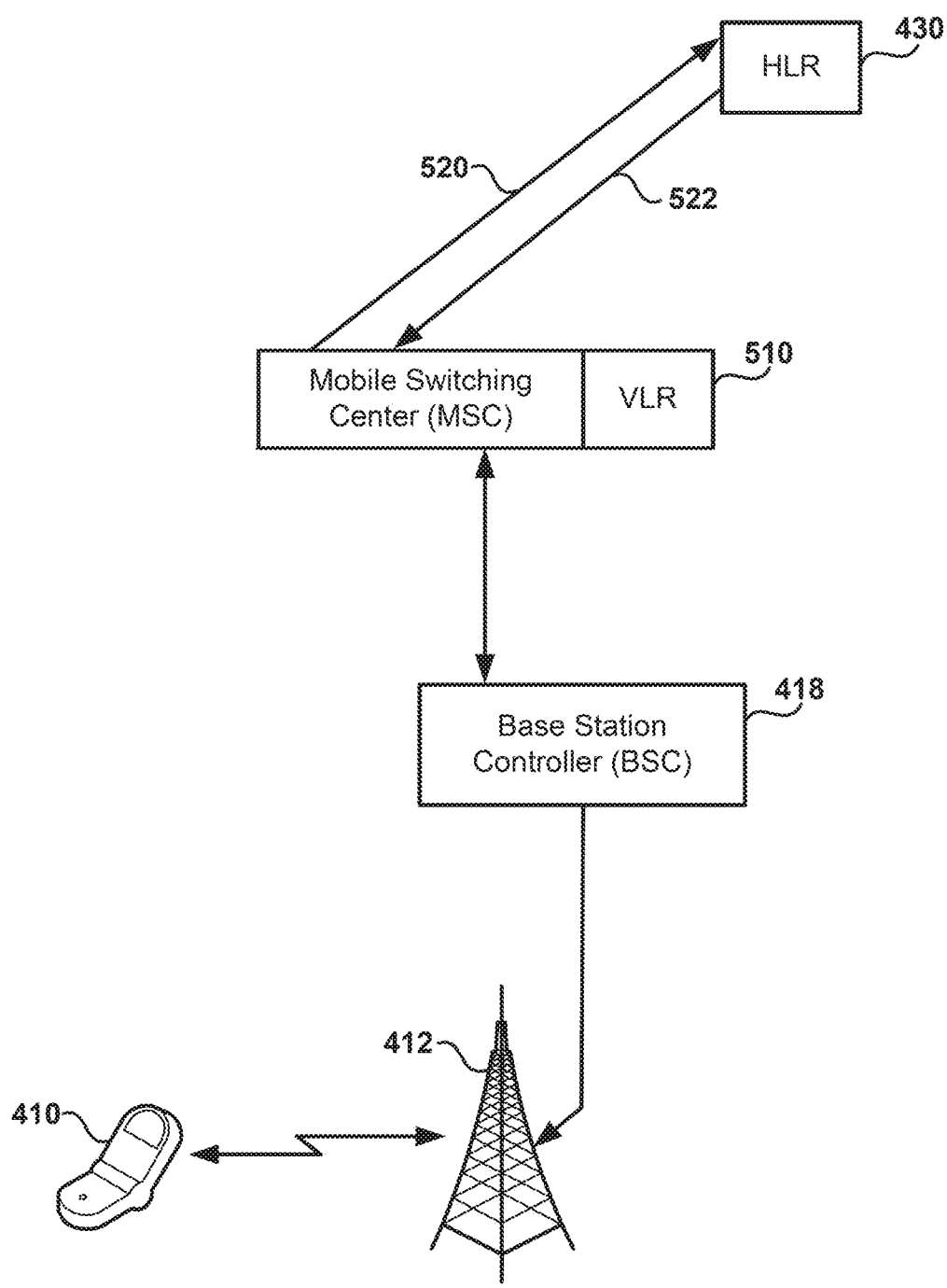
FIG. 5 illustrates communications between an a home location register (HLR) of a home network and a mobile switching center (MSC) having a coverage area that serves a mobile device.

The communications between the HLR 430 associated with a mobile device 410 and an MSC 424 is illustrated in greater detail in FIG. 5. Each MSC 424 has an associated visitor location register (VLR) 510 that maintains information pertaining to each mobile device serviced by that MSC 424. When the mobile device 410 attempts to register with a serving MSC 424 (such as by providing identification in the form of an IMSI or MIN)) by way of a network tower to the BSC 418, the MSC 424 transmits a location update signal 520 the HLR 430, in order to authenticate the mobile device. The HLR 430 (and the central system with which it is associated) authenticates the mobile device and then updates its information to reflect the MSC 424 currently serving the authenticated mobile device 410 (such location information is later utilized by the HLR 430 re-route incoming calls to the serving MSC 424). After the HLR 430 is updated with the serving MSC 424 information, the HLR 430 then transmits subscriber data in the form of a signal 522 to the VLR associated with the serving MSC 424. The use of an HLR to maintain location data and authenticate a mobile device as described above is known to those skilled in the art. Further details concerning the various functions performed by the HLR 430 and the other components of the illustrated networks 400 and 500 (FIGS. 4 and 5)) can be found, for example, in U.S. Pat. No. 6,038,445, "Providing Service Area Dependent Subscriber Data Within A Mobile Telecommunications Network," issued Mar. 14, 2002 Vladimir Alperovich et al, and hereby by incorporated by reference in its entirety.

The MSC 424 and/or its associated VLR 510 also stores more specific location information relating to the mobile device 410 (i.e., more specific that the information maintained at the HLR). For example, the more specific location information maintained at the MSC 424 (and its VLR) may identify the specific BSC 418 (and its network tower 412) through which the mobile device 410 is communicating, in order to properly route communications between the MSC 424 and local area or cell where the mobile device 410 is located. As will be described shortly, such specific location information could be used in some embodiments of the invention.

In one embodiment, location information for a mobile device being used to conduct a transaction (step 314, FIG. 3) is merely the identified MSC 424 and its location. For example, a database may be maintained by the authentication server 210 with data provided by various mobile service providers that defines the geographical area served by each MSC 424. If the geographical area is consistent with the location for a POS device at which a transaction is being conducted by the mobile device, then the POS device and mobile device are considered at the same location (step 320). The geographical location served by each MSC 424 (a "trust zone") may be useful in most circumstances for confirming that the mobile device and the POS device are at the same location, particularly when used in conjunction with scoring as described earlier. In other embodiments, the more specific information relating to BSC 418 or the network tower 412 (and its associated BTS) communicating with the mobile device may be provided by the MSC 424 to the HLR 430, and such specific location information may be accessed at the HLR for purposes of determining if the POS device is at the same location as the mobile device (step 320).

The authentication of a mobile device by a mobile service provider, e.g., when a mobile device moves between locations, is needed for various reasons, such as confirming that only an authorized subscriber is attempting to use subscription services, such as data services, rather than a third party that may have obtained the mobile subscriber identity (IMSI) in a surreptitious or fraudulent manner. The authentication of the mobile device by the mobile service provider is thus advantageously used, in embodiments of the present invention, to also verify that the authorized mobile device is at the same location as the POS device where a transaction is being conducted, thereby improving the operation and accuracy of authentication systems, and making it more difficult for fraudsters to conduct transactions with misappropriated mobile device identifiers.

Authentication of a mobile device by a mobile service provider as just described is well known to those skilled in the art. In its simplest form, a secret key and a ciphering algorithm are present at the mobile device on the SIM card and at an authentication system and HLR maintained by the mobile service provider. During authentication, the authentication system generates a random number that is sent to the mobile device, and both the mobile device and authentication system use the random number in conjunction with the secret key and the ciphering algorithm to generate a second encrypted number. The second encrypted number is returned from the mobile device to the authentication system, where it is compared to the second encrypted number generated at the authentication system. The secret key and ciphering algorithm for a specific mobile device may be stored, as noted earlier, at the HLR for that device and provided to the authentication system. Other authentication protocols are also known and could be used. One such authentication protocol is described in U.S. Pat. No. 6,745,029, "Method And Arrangement For Handling Network Specific Subscriber Data During Roaming By Use Of SIM Card Information Storage," issued Jun. 1, 2004 to Lauri Lahtinen et al., and another, more complex key agreement protocol is described in U.S. Pat. No. 9,088,408, "Key Agreement Using A Key Derivation Key," issued Jun. 21, 2015 to Matthew Campagna et al, both of which are hereby by incorporated by reference in their entirety.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the above description and the appended claims.

What is claimed is:

1. A method comprising:
   forming, by an authentication server, one or more registries comprising a first plurality of parameters pertaining to a plurality of devices utilized to conduct a set of transactions;
   computing, by the authentication server, a score based, at least in part, on the first plurality of parameters, wherein the first plurality of parameters include at least one of:
      a first subset of parameters representative of an occurrence of one or more past fraudulent transactions conducted via a first device of the plurality of devices,
      a second subset of parameters representative of an occurrence of one or more fraudulent uses of a second device of the plurality of devices, and/or
      a third subset of parameters representative of an occurrence of one or more fraudulent uses of at least one third device of the plurality of devices positioned in proximity with the second device;
   determining, by the authentication server, that a potentially fraudulent transaction has been initiated at the first device based at least in part on the computed score; and
   declining, by the authentication server, the potentially fraudulent transaction.

2. The method of claim 1, further comprising:
   determining that the first device comprises a point-of-sale (POS) device that is at least occasionally moved from a first location to a second location.

3. The method of claim 1, further comprising:
   determining that a location of the second device is inconsistent with one or more location patterns of the second device.

4. The method of claim 3, wherein the one or more location patterns of the second device correspond to one or more patterns of locations at which previously authenticated transactions have occurred.

5. The method of claim 1, wherein the first plurality of parameters pertaining to the plurality of devices comprise location parameters.

6. The method of claim 1, further comprising:
determining that the second device is presently at a location at which one or more attempted fraudulent transactions has previously occurred.

7. The method of claim 6 further comprising:
determining an increase in reported fraudulent transactions involving the at least one third device; and
modifying the computed score based, at least in part, on the increase in the reported fraudulent transactions involving the at least the third device.

8. The method of claim 1, wherein the second device is utilized as a presentation instrument to bring about a payment to the first device.

9. The method of claim 1, wherein the computed score is based, at least in part, on a likelihood that the second device and the first device are at a same location.

10. The method of claim 1, further comprising:
forming, by the authentication server, a PAN registry comprising one or more parameters of the second device.

11. The method of claim 1, wherein the second device comprises a mobile communications device.

12. An apparatus comprising:
an authentication server comprising one or more processors, and at least one memory device, the one or more processors to:
form, by the authentication server, one or more registries comprising a first plurality of parameters pertaining to a plurality of devices utilized to conduct a set of transactions;
compute, by the authentication server, a score based, at least in part, on the first plurality of parameters, wherein the first plurality of parameters include at least one of:
a first subset of parameters representative of an occurrence of one or more past fraudulent transactions conducted via a first device of the plurality of devices,
a second subset of parameters representative of an occurrence of one or more fraudulent uses of a second device of the plurality of devices, and/or
a third subset of parameters representative of an occurrence of one or more fraudulent uses of at least one third device of the plurality of devices positioned in proximity with the second device;
determine by the authentication server, that a potentially fraudulent transaction has been initiated at the first device based at least in part on the computed score; and
decline, by the authentication server, the potentially fraudulent transaction.

13. The apparatus of claim 12, wherein the one or more processors are additionally to:
determine that a location of the second device is inconsistent with one or more location patterns of the second device.

14. The apparatus of claim 13, wherein the one or more processors are additionally to:
determine that the one or more location patterns of the second device correspond to one or more patterns of locations at which previously authenticated transactions have occurred.

15. The apparatus of claim 12, wherein the plurality of devices comprise one or more point-of-sale (POS) devices and wherein the one or more processors are additionally to:
determine that the first plurality of parameters comprise one or more location parameters pertaining to the one or more POS devices.

16. The apparatus of claim 12, wherein the one or more processors are additionally to:
determine that the second device is at a location at which one or more attempted fraudulent transactions has previously occurred.

17. The apparatus of claim 16, wherein the one or more processors are additionally to:
determine an increase in reported fraudulent transactions involving the at least one third device; and
modify the computed score based, at least in part, on the increase in the reported fraudulent transactions involving the at least one third device.

18. The apparatus of claim 12, wherein the second device comprises a mobile communications device.

19. An article comprising:
a computer-readable medium, having instructions encoded thereon, which, when executed by a processor coupled to at least one memory device, direct the processor to:
form, by an authentication server, one or more registries comprising a first plurality of parameters pertaining to a plurality of devices utilized to conduct a set of transactions;
compute, by the authentication server, a score based, at least in part, on the first plurality of parameters, wherein the first plurality of parameters include at least one of:
a first subset of parameters representative of an occurrence of one or more past fraudulent transactions conducted via a first device of the plurality of devices,
a second subset of parameters representative of an occurrence of one or more fraudulent uses of a second device of the plurality of devices, and/or
a third subset of parameters representative of an occurrence of one or more fraudulent uses of at least one third device of the plurality of devices positioned in proximity with the second device;
determine by the authentication server, that a potentially fraudulent transaction has been initiated at the one first device based at least in part on the computed score; and
decline, by the authentication server, the potentially fraudulent transaction.

20. The article of claim 19, wherein the encoded instructions additionally direct the processor coupled to the at least one memory device to:
determine that a location of the second device is inconsistent with one or more location patterns of the second device, wherein the one or more location patterns of the second device correspond to one or more patterns of locations at which previously authenticated transactions have occurred.

21. The article of claim 19, wherein the encoded instructions additionally direct the processor coupled to the at least one memory device to:
determine that the second device is at a location at which one or more attempted fraudulent transactions have previously occurred.

22. The article of claim 19, wherein the encoded instructions additionally direct the processor coupled to the at least one memory device to:
determine an increase in reported fraudulent transactions involving the at least one third; and to modify the computed score based, at least in part, on the increase in reported fraudulent transactions involving the at least the third device.

* * * * *